Dec. 17, 1940.  D. B. BAKER ET AL  2,225,202
TRACTOR
Filed Dec. 20, 1937  3 Sheets-Sheet 1

Inventors
David B. Baker,
Clifford R. Rogers
and William O. Bechman
By
Atty.

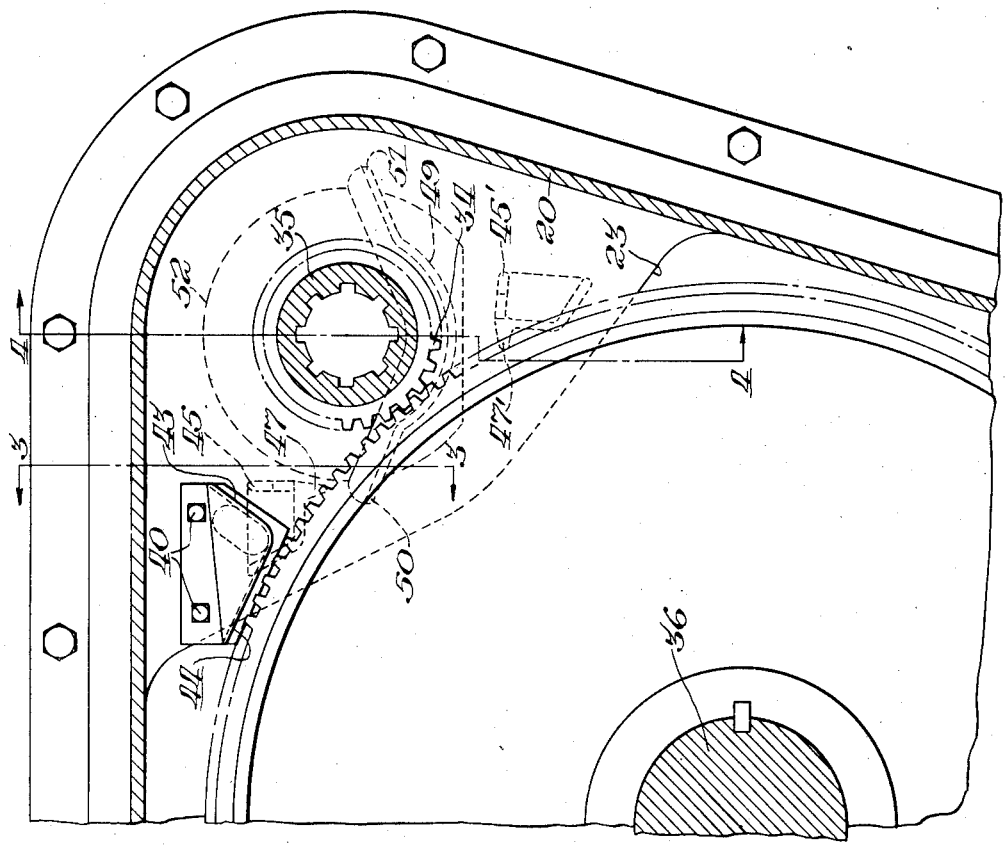
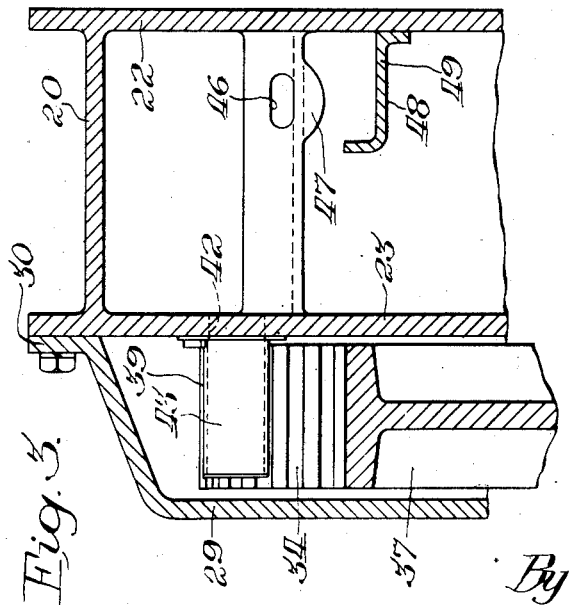

Inventors
David B. Baker,
Clifford R. Rogers,
and William O. Bechman
By
Atty.

Patented Dec. 17, 1940

2,225,202

UNITED STATES PATENT OFFICE 2,225,202

TRACTOR

David B. Baker, Riverside, Clifford R. Rogers, Oak Park, and William O. Bechman, Chicago, Ill., assignors to International Harvester Company, a corporation of New Jersey Application December 20, 1937, Serial No. 180,684

13 Claims. (Cl. 180—9.1)

This invention relates to a tractor, and more particularly to a crawler tractor of the wide tread type, in which the construction provides a novel arrangement of the body and associated housings for supporting and lubricating driving mechanisms contained therein.

On numerous occasions it becomes desirable to convert an ordinary crawler tractor to a wide tread tractor. This conversion is desirable because a wider tread naturally increases the stability of the tractor and is important in such instances as when the tractor is operated on hillsides or in oil fields for straddling pipe lines. It is often found, in converting a tractor from a narrow to a wide tread type, that material changes must be made in the construction of the tractor. Another problem that arises is the increases in length of certain shafting of the drive mechanism, which shafting must necessarily be provided with suitable bearings for obtaining support in the housings. The ordinary type of crawler tractor is provided with a main body, which is formed with a pair of transversely alined lubricant-free or dry compartments, in which are contained the steering mechanisms for the tractor. Each of these steering mechanisms includes a transverse shaft extending outwardly from the body. A final drive housing is secured at each side of the body and encloses each shaft, respectively. These housings carry a final drive bearing and form lubricant containing compartments. The final drive gearing operates in this lubricant and is driven by a pinion secured to each of the aforesaid shafts, respectively. In the conventional narrow tread tractor, each of these lubricant containing or wet housings is secured directly to the body and the bearings for supporting the shaft are properly lubricated as the gearing operates in the lubricant. A construction of this type is best disclosed in applicants' copending application filed July 17, 1937, Serial No. 154,221. However, when the tractor is to be converted to a wide tread tractor, it is necessary to interpose an intermediate housing between each side of the body and each final drive housing. In addition, in certain instances, each shaft of each steering mechanism must be replaced with a longer shaft to compensate for the outward disposition of the final drive housings. Since each of these shafts is of an increased length, an additional antifriction bearing must be provided, preferably substantially at the junction of the body and the intermediate housing. Under these circumstances, the lubricant from the final drive housings does not reach these inner bearings and, inasmuch as the clutch compartments are dry, these bearings obviously must operate with little or no lubrication.

The principal object of the invention, then, is to provide a construction which adapts a narrow tread tractor to ready conversion to a wide tread tractor, said construction including a novel arrangement of the driving and supporting parts.

Another important object is to provide for the proper support and lubrication of additional parts that are necessarily provided in the construction.

Another important object is to provide an arrangement of the component parts with respect to additional structure, wherein the construction of the tractor is not materially altered.

Another object of the invention is to provide certain of these structures as units, in which manner they may be readily and easily handled without unnecessary disassembling.

Still another object is to provide the additional housing structure with certain of the lubricating means formed as an additional part thereof.

Another object is to form these lubricating means in such a manner that the housings may be interchanged from right to left without interfering with the adaptability thereof.

Briefly, these and other objects are achieved in the following manner as provided by one practicable form of the invention. At each side of the rear portion of the tractor is provided a spacing housing structure, to which is secured a final drive housing containing final drive gearing. The body is provided with dry compartments, as previously mentioned, in which are carried steering mechanisms, each of which includes a shaft extending outwardly through the spacing housing and into the final drive housing. Each of these shafts is supported by a plurality of spaced bearings in the housing structure, the outer pair of bearings being adequately lubricated by the lubricant in the final drive housing. In order to properly lubricate the innermost bearing, a lubricant receiver is disposed tangentially adjacent one of the final drive gears and in this manner receives lubricant therefrom. The spacing housing is provided with an integrally formed lubricant receiver or trough, which receives lubricant from the first lubricant receiver for conveying the lubricant across that housing to a trough partially surrounding the innermost bearing. In this manner, then, as the final drive gearing operates, lubricant is carried to the first lubricant receiver. This lubricant then flows across the housing into the trough adjacent the inner bearing. A lubricant seal is associated with the innermost bearing for preventing leakage of the lubricant into the dry steering mechanism compartment. As will be hereinafter more fully described, it will be noted that one desirable feature of the construction is the provision whereby excess lubricant is not carried in the spacing housing structure, and, consequently, complicated sealing means are not necessary in the division between wet and dry compartments.

A more complete understanding of the objects and other desirable features of the invention may be had from the following detailed description taken in conjunction with the accompanying sheets of drawings, in which:

Figure 2 is an enlarged sectional view taken on the line 2—2 of Figure 1, showing the lubricant receivers;

Figure 3 is a sectional view taken on the line 3—3 of Figure 2, showing the transverse arrangement of a portion of the drive gearing and the lubricant receivers in the housings;

Figure 4:
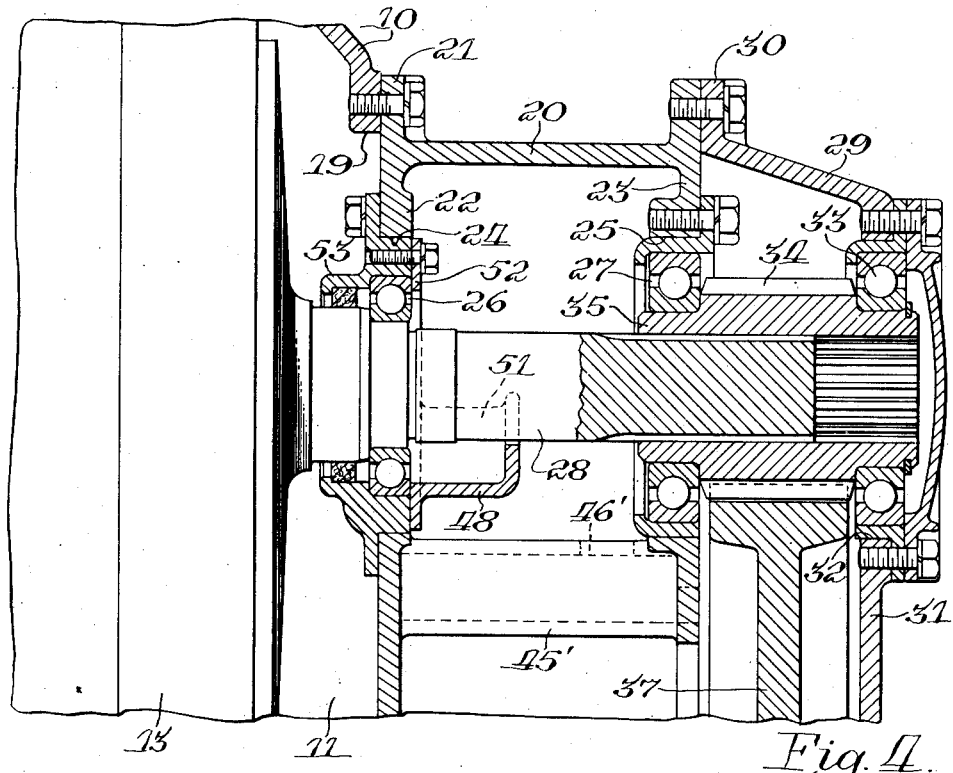
Figure 5:
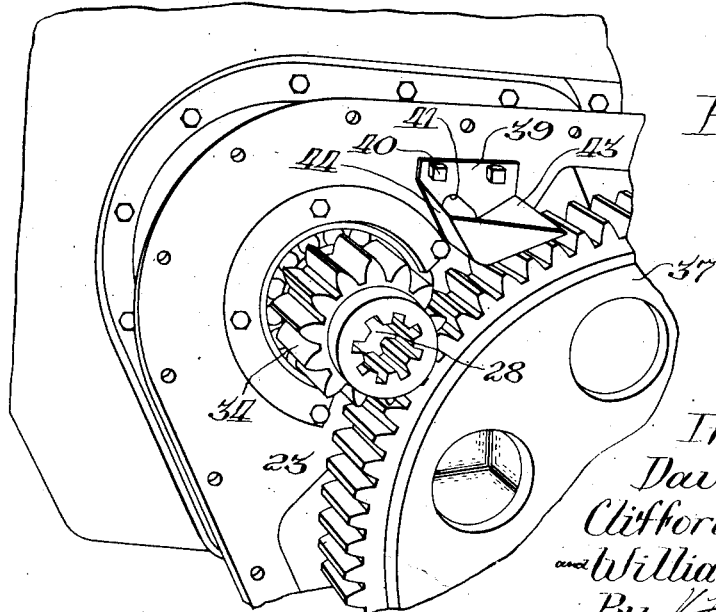

Figure 4 is a sectional view taken on the line 4—4 of Figure 2, showing the arrangement between the body and the housing structures and between the steering mechanism, the final drive gearing, the bearings and a portion of the means for lubricating the inner bearing; and Figure 5 is a perspective view of a portion of the housing structure with the final drive housing removed and showing a portion of the final drive gearing and the positions of the lubricant receiver with respect thereto.

Figure 1:
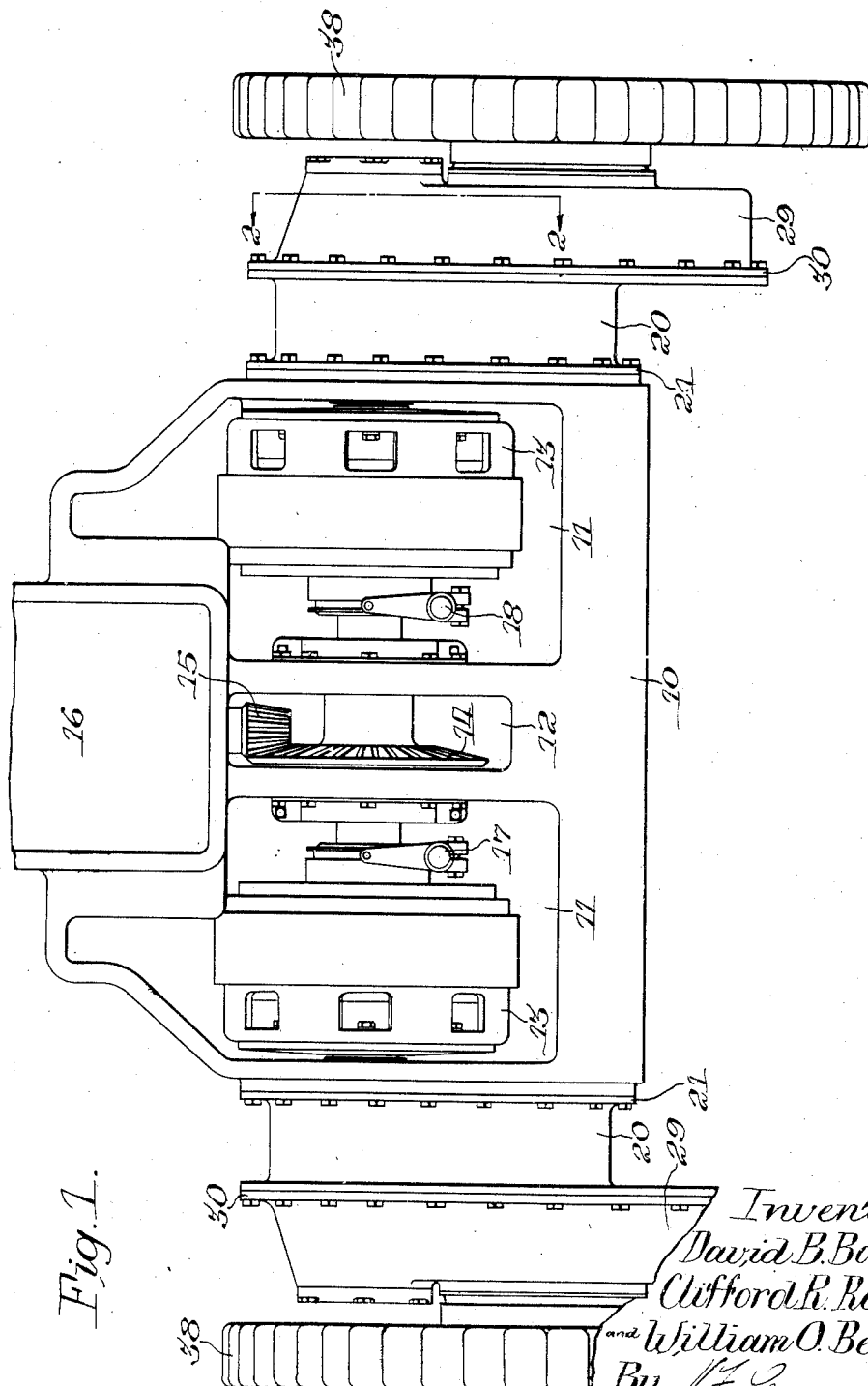
Figure 1 is a plan view of the rear portion of a crawler tractor, showing the relation between the body and the related housing structure when the tractor is converted to its wide tread form, certain parts having been omitted from the view in order to best illustrate the construction.

As previously mentioned, only a sufficient portion of the structure is illustrated as is deemed necessary to disclose the invention, and, for that reason, only the rear portion 10 of the main body of a tractor of the crawler type has been shown. As best shown in Figure 1, this body portion is provided with a pair of transversely alined compartments 11, separated by a central compartment 12. A steering mechanism, which comprises a pair of clutch and brake mechanisms 13, is carried transversely in the compartments of the body 10, each clutch and brake mechanism 13 being respectively disposed in each compartment 11. Because of the frictional nature of the clutch and brake mechanism, the compartments 11 are maintained substantially lubricant-free, or, as known in the art, are dry; that is, no lubricant is contained in the compartments in which the said mechanisms operate.

Drive gearing is contained in the central compartment 12 and consists of a bevel gear 14, which is driven by a bevel pinion 15, which is in driving relation with the transmission gearing, not shown, contained in a compartment enclosed and situated forwardly of the compartments 11 and 12. This transmission compartment is generally designated by the numeral 16. The transmission, of course, is driven by an engine forwardly thereof, not shown.

The construction thus far described is more or less conventional in tractors of the present type. The driving gears 14 and 15 operate in the compartment 12, which compartment is lubricant containing, or wet. This compartment is separated from each of the compartments 11, and consequently no lubricant can escape into either of these compartments. The only lubricant present in the compartments 11 is a small amount applied to the lever means for controlling the brake and clutch mechanisms, said means being generally indicated by the numerals 17 and 18. These control means are connected to hand or foot controls, not shown, mounted adjacent an operator's station, also not shown, as is conventional.

The following description pertains to the structure utilized when the tractor is to be operated as a wide tread tractor, and, as both sides are similar, only one side will be described, and like reference characters will denote like parts. The main body 10 is provided at its side with a comparatively large opening 19 open to the clutch and brake mechanism compartment 11. A housing 20, provided with a peripheral flange 21, is secured to the body 10 over the opening 19. This housing is provided with a pair of laterally spaced walls 22 and 23, the wall 22 completely closing the opening 19, as best shown in Figures 3 and 4. However, in the present construction, it is not absolutely necessary that the wall 23 be extended completely across the housing 20, but it may take the form of a partial wall, best shown in Figures 2, 4 and 5. Each of the walls 22 and 23 is provided with an opening 24 and 25, respectively. These openings are in transverse alinement and are adapted to support antifriction bearings 26 and 27, respectively.

The clutch and brake mechanism 13, previously referred to, includes a transversely extending shaft 28 which extends outwardly from the compartment 11 and through the housing 20, being associated in supporting relation with the bearings 26 and 27.

A second housing 29, having a peripheral flange 30, is secured to the outer face of the housing 20, as best shown in Figures 1, 3 and 4. The housing 29 is further provided with an outer wall portion 31, which is formed with an opening 32 in transverse alinement with the aforesaid openings 24 and 25 in the housing 20. An antifriction bearing 33 is carried by the wall 31 within the opening 32.

The housings thus far described provide a housing structure formed with a lubricant-containing, or wet, compartment, which is principally located within the second housing 29. However, as will be presently more clearly described, the level of the lubricant is below the vicinity of the aforementioned bearings. Final drive gearing is located within this housing structure and operates in the lubricant contained therein. This final drive gearing includes a final drive pinion or gear 34, which is splined to or otherwise secured for rotation with the shaft 28. This pinion is provided at each side thereof with bearing portions 35, which are associated in supporting relation with the bearings 27 and 33. In this manner, it may be said that the shaft 28 is supported at spaced points by the bearings 26, 27 and 33.

As is more or less conventional in most tractors of the type disclosed, a shaft 36 is carried by either the body 10 or the housing structure and extends outwardly beyond the second housing 29. The aforementioned final drive gearing also includes a comparatively large bull gear 37, which is carried by the shaft 36 and driven by the pinion 34. Outwardly of the housing structure, the gear 37 is associated in driving relation in any well known manner with a sprocket wheel 38, also carried by the shaft 36, which in turn drives the conventional endless track, not shown.

From the foregoing description, it will be apparent that a wide tread tractor may be provided by the addition of the intermediate spacer housings 20 and the shafts 28. These shafts 28 merely replace similar shorter shafts by an operation which consists in removing the clutch and brake mechanisms from the compartments 11. One construction providing for the removal of the clutch and brake mechanisms is described in detail in the above referred to copending application.

It will be appreciated that addition of the intermediate housings 20 does not alter in any manner the operation of the tractor. As is the case when the tractor is utilized in its narrow tread adaptation, power is transmitted from the transmission gearing to the drive gearing 14 and 15, and thence to the clutch and brake mechanism 13. The clutch and brake mechanisms, in turn, drive the opposite final drive gearing, respectively, through the shafts 28. The manner of controlling these mechanisms remains the same, the operator braking and slipping the clutches, by means of controls operatively connected to the means 17 and 18, for the purpose of steering the tractor. Because of the construction of the housing structure and its relation to the other component parts, a rigidly constructed wide tread tractor is provided, having all the ease of maneuverability of the narrow tread type. A particular advantage of the wide tread tractor, as previously mentioned, is that the increased spacing of the tracks naturally results in greater stability of the tractor. It is obvious, of course, that certain minor changes must be made in the forward construction of the means by which the tractor is supported on the opposite track frames. However, this construction is more or less conventional, forming no part of the present invention, and for that reason it is not shown.

It will be apparent from an examination of the drawings that, inasmuch as lubricant is contained in the compartment in the housing 29, to a certain level, the rotation of the gears 34 and 37 will result in a certain amount of said lubricant being carried upwardly to the vicinity of the bearings 27 and 33, thus sufficiently lubricating them. It will also be apparent that, inasmuch as the compartment 11 is substantially lubricant-free, or dry, and as the level of the lubricant in the housing structure does not reach a sufficient height to approach the vicinity of the bearing 26, this bearing will not receive proper lubrication. Therefore, it becomes necessary to provide a lubricating means, a preferred form of which will be presently described, for transferring some of the lubricant from the wet compartment in the housing structure across the housing 20 to lubricate the bearing 26.

For the purpose of receiving lubricant from the wet compartment in the housing structure, a lubricant receiver in the form of a sheet metal scupper 39 is positioned in the housing and secured by bolts 40 to the outer wall portion 23 of the housing 20. An opening 41 is provided in the scupper 39, said opening coinciding with an opening 42 formed in the wall 23 of the housing 20. As is best shown in Figures 2 and 5, the scupper 39 is located in the housing structure adjacent the upper portion of the bull gear 37 and slightly rearwardly of the driving pinion 34. The scupper is further formed with an inclined bottom portion 43, which is disposed substantially at a tangent to the periphery of the gear 37, and in this manner is adapted to receive lubricant therefrom. Because of the inclination of the bottom portion 43, it may be said that the scupper 39 scrapes lubricant from the gear 37, especially during low speed operation of the tractor. At its forward end, the scupper 39 is provided with an upwardly inclined portion 44, which joins the inclined bottom portion 43 in a curve substantially in alinement with the aforementioned openings 41 and 42, this curved portion forming substantially a trough whereby the lubricant received from the gear 37 may flow through the openings. This forward portion 44 becomes additionally important when it is realized that at high speed operation of the final drive gearing, lubricant is thrown centrifugally from the gear 37, said lubricant being caught by the aforesaid forward portion.

In order to transfer the lubricant from the receiver or scupper 39 across the housing 20 to the bearing 26, a second receiver or trough 45 is provided in the housing structure. This trough is preferably cast integrally with the housing 20 and joins the opposite walls 22 and 23, being disposed slightly below the opening 42 in the wall 23. This receiver or trough 45 is preferably U-shaped in cross section, having a front and rear wall and a bottom, the front wall being provided with an opening 46 therethrough. A downwardly extending portion or lip 47 is formed on the bottom of the trough in substantially vertical alinement with the front wall and the opening 46. This lip is disposed adjacent the inner wall 22 of the housing 20, as best shown in Figure 3.

A third lubricant receiver or trough 48 is secured to the inner wall 22 of the housing 20 in the vicinity of the bearing 26. This trough has an arcuate portion 49, which partially surrounds a lower portion of the bearing. The trough is further formed with a pair of extending portions, or wings, 50 and 51, which are symmetrically disposed with relation to the other portions of the trough or receiver. As best shown in Figures 2 and 3, the wing portion 50 is disposed directly below the lip 47 formed on the trough 45 for a purpose to appear presently. A circular flange portion 52 is formed on the trough 48 for securing the trough in position adjacent the inner wall 22 of the housing 20.

In providing a structure for easily and readily adapting a narrow tread tractor for conversion to a wide tread tractor, it is desirable to provide any additional structure in a manner which will utilize to the best advantage the structure incorporated in the tractor design. For this reason, numerous parts are made of such sizes and shapes that they may be readily disposed and arranged in relation to both the standard and additional parts.

With the receivers or troughs located as described above, lubricant from the wet compartment in the housing structure is easily transferred across the housing to the bearing 26. The receiver or scupper 39 receives lubricant from the gear 37, said lubricant then flowing through the openings 41 and 42 into the U-shaped receiver or trough 45. The lubricant gradually accumulates in the trough 45 and flows out through the opening 46 in the front wall therein, dripping downwardly over the lip 47 to the wing portion 50 of the third receiver or trough 48. The lubricant then flows down the inclined wing toward the central arcuate portion 49 and thus lubricates the bearing 26. By this means, a simple and efficient provision is made for supplying lubricant from the housing 29 to the bearing 26.

In order to prevent the escape of this lubricant into the compartment 11, where it would interfere with the efficient operation of the clutch and brake mechanism 13, a suitable lubricant seal 53 is associated with the bearing 26.

To the feature of ready adaptability of the housing 20 to the structure of a wide tread tractor is added the feature of interchangeability; that is, as provided by the present invention, the housing 20 may be used on either the right or left sides of the tractor. This feature is achieved in one form by providing a second trough 45' in the housing 20. This trough 45' is identical to the trough 45 previously described, being provided with an opening 46' and a lip 47'. However, in the relation of the two troughs to each other, the openings 46 and 46' and the lips 47 and 47', respectively, are reversed. The location of these two troughs 45 and 45' is best shown in Figure 2.

In the event that the right and left hand housings 20 are interchanged the respective portions of the trough 45' will assume the same position with respect to the component parts at the left side of the tractor that the trough 45 assumes at the right hand side of the tractor. In addition, the trough 48 may be utilized at either side because of the provision of the two wings 50 and 51, the wing 51 receiving lubricant from the trough 45' at the left side. Thus, it will be seen that in the event that the tractor is repeatedly converted from one tread to another, the task of assembling is made easier by eliminating the necessity of care in the choice of right and left hand parts.

The above described construction is, however, only a preferred embodiment of the invention and incorporates certain features peculiar to that design. It will be understood, however, that numerous modifications and alterations may be made in the construction without sacrificing any of the features thereof and without departing from the spirit and scope of the invention as defined in the appended claims.

What is claimed is:

1. In a tractor, the combination of a body formed with a substantially lubricant-free compartment open at a side, a housing carried by the body and having an inner and an outer wall, said inner wall enclosing said opening, each of said walls being formed with an opening in transverse alinement, an antifriction bearing carried in each opening, a second housing carried by the first housing and forming with the outer wall thereof a lubricant containing compartment, an antifriction bearing disposed in said second housing in transverse alinement with the aforesaid bearings, clutch mechanism disposed in the body compartment and including a shaft extending transversely through the first housing and into the second housing, said shaft being rotatably carried by the aforesaid bearings, and drive gearing carried in and enclosed by the second housing and driven by the shaft.

2. In a tractor, the combination of a body formed with a substantially lubricant-free compartment open at a side, a housing carried by the body and having an inner and an outer wall, said inner wall enclosing said opening, each of said walls being formed with an opening in transverse alinement, an antifriction bearing carried in each opening, a second housing carried by the first housing and forming with the outer wall thereof a lubricant containing compartment, an antifriction bearing disposed in said second housing in transverse alinement with the aforesaid bearings, clutch mechanism disposed in the body compartment and including a shaft extending transversely through the first housing and into the second housing, said shaft being rotatably carried by the aforesaid bearings, drive gearing carried in and enclosed by the second housing and driven by the shaft, and means disposed in the housings for receiving lubricant from the gearing for conveying said lubricant across the housings to the bearing in the inner wall of the first housing.

3. In a tractor, the combination of a body formed with a substantially lubricant-free compartment, a housing carried by the body adjacent the compartment, a wall between the body and the housing enclosing the compartment, a bearing disposed in the wall between the housing and the compartment, a second bearing disposed in the housing spaced from and in transverse alinement with the first bearing, clutch mechanism carried in the compartment and including a shaft extending through the wall and outwardly beyond the housing, said shaft being supported by the aforesaid bearings, a second housing carried by the first housing and forming a lubricant containing compartment, and drive gearing carried in and enclosed by said second housing and driven by the shaft.

4. In a tractor, the combination of a body formed with a substantially lubricant-free compartment, a housing carried by the body adjacent the compartment, a wall between the body and the housing enclosing the compartment, a bearing disposed in the wall between the housing and the compartment, a second bearing disposed in the housing spaced from and in transverse alinement with the first bearing, clutch mechanism carried in the compartment and including a shaft extending through the wall and outwardly beyond the housing, said shaft being supported by the aforesaid bearings, a second housing carried by the first housing and forming a lubricant containing compartment, drive gearing carried in and enclosed by said second housing and driven by the shaft, and means disposed in the housings for receiving lubricant from the gearing for conveying said lubricant to the first bearing.

5. In a tractor, the combination of a body formed with a substantially lubricant-free compartment, clutch mechanism carried in said compartment and including a shaft extending outwardly therefrom, a housing carried by the body and having a portion substantially surrounding said shaft, said housing having walls forming a substantially lubricant-free compartment, a bearing in a wall of the housing for supporting the shaft adjacent the compartment, a second bearing in another wall of the housing for supporting the shaft at a point spaced axially outwardly from the first bearing, a second housing carried by the first housing and forming a lubricant containing compartment enclosing the end of the shaft, a bearing within said housing for supporting the shaft adjacent its outer end, and drive gearing within said second housing and driven by the shaft.

6. In a tractor, the combination of a body formed with a substantially lubricant-free compartment, clutch mechanism carried in said compartment and including a shaft extending outwardly therefrom, a housing carried by the body and having a portion substantially surrounding said shaft, said housing including a substantially lubricant-free compartment, a bearing within the housing for supporting the shaft adjacent the body compartment, a second bearing within the housing for supporting the shaft at a point spaced axially outwardly from the first bearing, a second housing carried by the first housing and forming a compartment containing lubricant at a level lower than the bearing, said housing enclosing the end of the shaft, a bearing within said second housing for supporting the shaft adjacent its enclosed outer end, drive gearing within said second housing and driven by the shaft, and means disposed in the housings for receiving lubricant from the gearing for conveying said lubricant in small quantities across the first housing to the first bearing.

7. In a tractor, the combination of a body formed with a substantially lubricant-free compartment, a housing carried by the body, a second housing carried by the first housing, said housings providing two separate compartments in spaced relation to the first compartment, said three compartments being spaced and separated by a plurality of walls, the compartment in the first housing being also substantially lubricant-free and the compartment in the second housing containing lubricant, an antifriction bearing carried in alinement in each wall, clutch mechanism carried in the body compartment and including a shaft extending into the other compartments, said shaft being supported at spaced points by the bearings, and drive gearing carried in and enclosed by the second housing and driven by the shaft.

8. In a tractor, the combination of a body formed with a substantially lubricant-free compartment, a housing carried by the body, a second housing carried by the first housing, said housings providing two separate compartments in spaced relation to the first compartment, said three compartments being spaced and separated by a plurality of walls, the compartment in the first housing being also substantially lubricant-free and the compartment in the second housing containing lubricant, an antifriction bearing carried in alinement in each wall, clutch mechanism carried in the body compartment and including a shaft extending into the other compartments, said shaft being supported at spaced points by the bearings, a drive pinion secured to the shaft between the two outermost bearings, and drive gearing carried in and enclosed by the second housing and driven by the pinion.

9. In a tractor, the combination of a body formed with a substantially lubricant-free compartment, a housing carried by the body, a second housing carried by the first housing, said housings providing two separate compartments in spaced relation to the first compartment, said three compartments being spaced and separated by a plurality of walls, the compartment in the first housing being also substantially lubricant-free and the compartment in the second housing containing lubricant, an antifriction bearing carried in alinement in each wall, clutch mechanism carried in the body compartment and including a shaft extending into the other compartments, said shaft being supported at spaced points by the bearings, a drive pinion secured to the shaft between the two outermost bearings, drive gearing carried in and enclosed by the second housing and driven by the pinion, and means disposed in the housings for receiving lubricant from the gearing and conveying said lubricant across the lubricant-free compartment in the first housing to the innermost bearing adjacent the body compartment.

10. In a tractor, the combination of a body formed with a substantially lubricant-free compartment, a housing disposed in spaced relation alongside the body and forming a compartment for containing lubricant, a wide tread adapter housing disposed intermediate and secured to the body and the first housing, thereby separating the aforesaid two compartments, clutch mechanism carried in the body compartment and including a shaft extending through the adapter housing into the first housing, a bearing carried substantially at the junction of the body and the adapter housing, drive gearing carried in the first housing and operating in the lubricant contained therein, and means associated with the adapter housing for transferring across said adapter housing a portion of the lubricant from the first housing compartment to the aforesaid bearing.

11. In a tractor, the combination of a body formed with a clutch compartment, said compartment including an opening at one side, a clutch carried in the compartment and including a shaft extending axially outwardly through the side opening, a housing secured to the body at the side of the compartment and having a pair of axially spaced walls, the inner one of which substantially closes the side opening, each of said walls having an opening therein surrounding the shaft, a second housing secured to the first housing and including a wall arranged in axially spaced relation with the outer wall of the first housing, said last named wall having an opening therein surrounding the shaft, the outer wall of the first housing and the wall of the second housing providing a drive gearing compartment separated from the clutch compartment by the interposed first housing, drive gearing contained in the gearing compartment and associated with the clutch shaft, said gearing including a pinion secured to the shaft between the two outer walls, said pinion having opposite, cylindrical end portions arranged respectively within the openings in said two outer walls, a bearing in the inner wall journaling the clutch shaft, and a pair of bearings in the two outer walls journaling the pinion respectively on its cylindrical end portions.

12. In a tractor, the combination of a body formed with a substantially lubricant-free clutch compartment, said compartment including an opening at one side, a clutch carried in the compartment and including a shaft extending axially outwardly through the said opening, a housing secured to the body at the side of the compartment and having a pair of axially spaced walls, the inner one of which substantially closes the side opening, each of said walls having an opening therein surrounding the shaft, said walls forming a second lubricant-free compartment, an integral lubricant trough extending across the walls parallel to the clutch shaft, the other wall having a small opening substantially coincident with the trough, a second housing secured to the first housing and including a wall arranged in axially spaced relation with the outer wall of the first housing, said last named wall having an opening therein surrounding the shaft, the outer wall of the first housing and the wall of the second housing providing a lubricant-containing drive gearing compartment separated from the clutch compartment by the interposed first housing, drive gearing contained in the gearing compartment and associated with the clutch shaft, said gearing including a pinion secured to the shaft between the two outer walls, a bearing in the inner wall journaling the clutch shaft, and a pair of bearings in the two outer walls journaling the clutch shaft, and a lubricant receiver disposed in the gearing compartment in the vicinity of the aforesaid pair of bearings and communicating with the small opening in the outer wall of the first housing, said receiver receiving lubricant from the drive gearing and conveying it to the trough for lubricating the clutch shaft bearing in the inner wall of the first housing.

13. In a tractor, the combination of a body formed with a clutch compartment, said compartment including an opening at one side, a clutch carried in the compartment and including a shaft extending axially outwardly through the side opening, said shaft having a splined outer end, a housing secured to the body at the side of the compartment and having a pair of axially spaced walls, the inner one of which substantially closes the side opening, each of said walls having an opening therein surrounding the shaft, a second housing secured to the first housing and including a wall arranged in axially spaced relation with the outer wall of the first housing, said last named wall having an opening therein surrounding the shaft, the outer wall of the first housing and the wall of the second housing providing a drive gearing compartment separated from the clutch compartment by the interposed first housing, drive gearing contained in the gearing compartment and associated with the clutch shaft, said gearing including a pinion splined to the splined outer end of the shaft between the two outer walls, said pinion having opposite, cylindrical end portions arranged respectively within the openings in said two outer walls, a bearing in the inner wall journaling the clutch shaft, and a pair of bearings in the two outer walls journaling the pinion respectively on its cylindrical end portions.

DAVID B. BAKER.
CLIFFORD R. ROGERS.
WILLIAM O. BECHMAN.

CERTIFICATE OF CORRECTION.

Patent No. 2,225,202. December 17, 1940.

DAVID B. BAKER, ET AL.

It is hereby certified that error appears in the printed specification of the above numbered patent requiring correction as follows: Page 4, second column, line 52, claim 4, after "lubricant" insert --in small quantities across the housings--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.